United States Patent [19]

Tazawa et al.

[11] Patent Number: 4,596,593

[45] Date of Patent: Jun. 24, 1986

[54] UREA-FORMALDEHYDE CONDENSATE-BASED SLOW RELEASE NITROGEN FERTILIZER AND PROCESS FOR PRODUCING SAME

[75] Inventors: Shunsuke Tazawa, Tokyo; Katsuhiko Kurihara, Yokohama; Yuzuru Kawagoe, Abiko; Seinosuke Ando, Sayama; Kazuhiko Kon, Hachinohe, all of Japan

[73] Assignee: Nitto Chemical Industry Co., Ltd., Japan

[21] Appl. No.: 612,805

[22] Filed: May 22, 1984

[30] Foreign Application Priority Data

May 25, 1983 [JP] Japan .................................. 58-90792
May 25, 1983 [JP] Japan .................................. 58-90793

[51] Int. Cl.$^4$ ............................................. C05C 9/00
[52] U.S. Cl. ............................................. 71/28; 71/30; 71/64.11
[58] Field of Search ........................... 71/28, 30, 64.11

[56] References Cited

U.S. PATENT DOCUMENTS 4,411,683 10/1983 Goertz ................................... 71/28

Primary Examiner—Ferris H. Lander
Attorney, Agent, or Firm—Cushman, Darby & Cushman

[57] ABSTRACT

A slow release nitrogen fertilizer comprising a hydrous cured product of urea-formaldehyde condensate in which the total methylol content is 0.1 to 1.0% by weight (based on the weight of hydrous product) and the hot water-dissolution percentage [percentage of the cured product dissolved in hot water at 80° C. when the product has been immersed therein for 30 minutes (based on the weight of anhydrous product)] is 10% by weight or less.

17 Claims, No Drawings

UREA-FORMALDEHYDE CONDENSATE-BASED SLOW RELEASE NITROGEN FERTILIZER AND PROCESS FOR PRODUCING SAME

BACKGROUND OF THE INVENTION

1. Field of the Invention

This invention relates to a process for producing a urea-formaldehyde condensate-based slow release nitrogen fertilizer which, after application to the soil, is capable of releasing nitrogen into the soil for a prolonged period of time to enable advantageous cultivation of plants.

2. Description of Prior Art

Methods for using urea-formaldehyde condensates as a nitrogen fertilizer are known. For instance, Japanese Patent Publication No. 1,166/71 proposes a method which comprises foaming a urea-formaldehyde resin by use of a foaming agent in an appropriate foaming apparatus, crashing the resulting foamed cured product into fine grains with a size of 0.1 to 20 mm by a crasher, adding water thereto to form a slurry, mixing the resulting slurry with plant seeds, etc., and applying the resulting mixture to the soil. Also, Japanese Patent Publication No. 56,517/82 discloses a method which comprises reacting urea with formaldehyde in a urea : formaldehyde molar ratio of 1:2 to 2.5 to form methylolurea or a urea-formaldehyde precondensate of such a condensation degree that the condensate is substantially soluble in water, then adjusting the obtained reaction mixture to a pH of 3 to 7 and spray-drying the same at a temperature of 200° to 400° C. to produce fine hollow spheres of urea resin having a specific partial water solubility, and using the fine hollow spheres as a slow release fertilizer.

However, none of the conventional ureaformaldehyde condensate-based slow release fertilizers including those exemplified above are suitable as a slow release fertilizer, because these conventional fertilizers have such problems as quick conversion into an inorganic substance, inhibition of the germination of seeds and the like. Also, many of the processes for preparing such conventional fertilizers are complicated.

SUMMARY OF THE INVENTION

Under the above circumstances, the present inventors have conducted extensive research for the purpose of providing a urea-formaldehyde condensate-based slow release nitrogen fertilizer of better performance than the conventional ones. As a result, it has been found that a hydrous cured product of a urea-formaldehyde condensate in which the total methylol content is 0.1 to 10% by weight (based on the weight of hydrous product) and the hot water dissolution percentage [percentage of the cured product dissolved in hot water at 80° C. when the product has been immersed therein for 30 minutes (based on the weight of anhydrous product)] is 10% by weight or less meets the above purpose.

DETAILED DESCRIPTION OF THE INVENTION

The urea-formaldehyde condensate-based slow release nitrogen fertilizer of this invention can be easily produced by either of the following two processes:

Process A comprises:

(a) reacting urea with formaldehyde in a urea : formadehyde molar ratio of 1:2.0 to 2.5 to form an aqueous solution of a urea-formaldehyde precondensate with such a condensation degree that the condensate is substantially soluble in water;

(b) adding to said aqueous solution urea in such an amount as to satisfy the following relation:

$$(\mu' + \mu) : F = 1 : 0.9 - 1.2$$

wherein
 $\mu'$: molar amount of urea used in this step; $\mu$: molar amount of urea used in the step (a);
 F : molar amount of formaldehyde used in the step (a), and subjecting the mixture to reaction until the reaction mixture becomes slightly turbid;

(c) adding to the thus obtained reaction mixture a curing agent and reacting them while kneading and dehydrating the mixture to produce a hydrous cured product in which the total methylol content is 0.1 to 1.0% by weight (based on the weight of hydrous product) and the hot water-dissolution percentage [percentage of the cured product dissolved in hot water at 80° C. when the product has been immersed therein for 30 minutes (based on the weight of anhydrous product)] is 10% by weight or less.

This process will be explained in detail below. In the step (a), urea and formaldehyde are reacted in a urea : formaldehyde molar ratio of 1:2.0 to 2.5 to produce an aqueous solution of a urea-formaldehyde primary condensate with such a condensation degree that the condensate is substantially soluble in water.

The formaldehyde used in this reaction is usually a commercially available aqueous formaldehyde solution with a formaldehyde concentration of 35 to 40% by weight, and especially, an aqueous formaldehyde solution with a formaldehyde concentration of about 37% by weight is preferred.

The conditions for the reaction of urea with formaldehyde in the step (a) can be selected from those which are commonly used in the production of condensates of this type.

The typical conditions in the step (a) are as follows: a mixture of urea and 37% formalin in a urea: formaldehyde molar ratio of 1:2.0 to 2.5 is made weakly alkaline, preferably adjusted to a pH of 7 to 8, with an alkaline substance such as sodium hydroxide, and the mixture is subjected to reaction at a temperature of 20° to 95° C. for a period of 1 to 30 minutes.

The resulting reaction product is in the form of an aqueous solution comprising a major amount of dimethylolurea, a minor amount of monomethylolurea and trimethylolurea and a trace of free formaldehyde.

This aqueous reaction product solution is adjusted to a pH of 3.5 to 7 and then subjected to further reaction at a temperature of 80° to 98° C. for several hours or more.

The reaction is terminated at such a point that the solution becomes slightly turbid when the reaction mixture is cooled to 20° C. If the reaction is further continued, the condensation of the urea-formaldehyde primary condensate proceeds too much to obtain a homogenous objective product.

After the reaction is terminted, the reaction product solution may be, if necessary, adjusted to a pH of 7 to 9 with an alkaline substance for enhancing the storge stability.

Subsequently, in the step (b), urea is added to said reaction product solution and both are further reacted. The amount of urea used in this reaction is such that the following relation is satisfied:

$(\mu' + \mu) : F = 1 : 0.9 - 1.2$ wherein $\mu'$: molar amount of urea used in the step (b);
$\mu$: molar amount of urea used in the step (a);
F: molar amount of formaldehyde used in the step (a).

If the amount of urea used in the step (b) is below the range specified in this invention, the cured product of the urea-formaldehyde condensate produced in the subsequent step (c) becomes too stiff and the objective product becomes difficult to obtain. Also, the resulting product would inhibit the germination of seeds and would exhibit its fertilizing response too rapidly to maintain the response for a long time.

On the other hand, in case the amount of urea used in the step (b) exceeds the range defined in this invention, the production of the objective product is easy, but the resulting product would inhibit the germination of seeds and exhibit its fertilizing response too rapidly as in the case of use of too small an amount of urea.

The reaction between urea and the reaction product solution obtained in the step (a) is usually carried out at a temperature within the range of from 20° to 95° C. for a period within the range of from 0.5 to 24 hours, though the reaction time may be shortened at higher temperatures in said range and may be prolonged at lower temperatures. For example, at a reaction temperature of 80° C., the reaction may be terminated in aout one hour.

It is not necessary to define the end point of the reaction so critically in view of the further reaction in the subsequent step (c). Usually, it is expedient to terminate the reaction at a time when the reaction product solution becomes a slightly turbid.

In the step (c), a curing agent is added to the reaction product solution obtained in the step (b) is added, and they are reacted while kneading and dehydrating the same in an appropriate apparatus to obtain the final product (slow release fertilizer) comprising a hydrous cured product of the urea-formaldehyde primary condensate.

Any curing agent capable of curing the urea-formaldehyde primary condensate may be used in this step (c), but usually the acidic substances are used, the preferred examples thereof including sodium hydrogensulfate, potassium hydrogensulfate, monosodium hydrogenphosphate, monopotassium hydrogenphosphate, phosphoric acid, acetic acid, citric acid, and tartaric acid. These curing agents may be used either alone or in admixture.

The curing agent is used usually in such an amount that the reaction product solution is made weakly acidic (pH about 3 to 5). Thus, in case of using concentrated sulfuric acid, for instance, the acid is added in an amount of 0.5 to 5% by weight based on the weight of the reaction product solution.

Since the materials to be treated in the step (c) are initially in the form of an aqueous solution and then changed to a slurry, a paste and finally to a particle or powder, the apparatus to be used in the treatment in the step (b) must be such that the material to be treated in these various forms can be continuously stirred, mixed and homogenized and any apparatus satisfying these conditions may be used regardless of shape and structure. The preferred examples of such apparatus include such kneading machines as various types of kneaders, ribbon mixers, etc.

The reaction product solution obtained in the step (b) and said curing agent are fed to a kneading machine such as mentioned above and kneaded therein at a low speed usually at a temperature of 60° to 80° C. while removing water by evaporation from the reaction product solution. In this operation, it needs to properly control the dehydration degree because too high a dehydration degree results in too small a particle size of the final product while too low a dehydration degree causes formation of a large ball-like material. In both cases, the product must be subjected to any after-treatment for obtaining a product in the optimum form as a fertilizer. Accordingly, in the operation of the step (c), the dehydration degree is desirably controlled so that the water content in the final product is usually 35 to 45% by weight, preferably 40% by weight. Such a treatment can provide a final product having a particle size of usually 0.5 to 5 mm, which is best suited for application as a fertilizer.

The curing reaction of the urea-formaldehyde primary condensate with an acid proceeds more rapidly at a lower pH of the reaction system and at a higher reaction temperature. Also, the longer the reaction time, the higher the curing reaction. As the reaction proceeds, the total methylol content in the product decreases and also the hot water dissolution percentage of the cured product reduces.

In the step (c), said reaction conditions are properly selected and combined to obtain a final product having the characteristics that the total methylol content is 0.1 to 1.0% by weight (based on the weight of hydrous product) and the hot water dissolution percentage [(percentage of the cured product dissolved in hot water at 80° C. when immersed therein for 30 minutes (based on the weight of anhydrous product)] is 10% by weight or less.

If the total methylol content in the final product and the hot water dissolution percentage are outside the above-defined ranges, such undesirable problems will arise that when the final product is applied as a fertilizer to the soil, it may inhibit the germination of seeds or the effect thereof as a fertilizer cannot be kept for a long period of time.

Another process (Process B) for producing a urea-formaldehyde condensate-based slow release fertilizer according to this invention comprises:

(a') reacting urea and formaldehyde in a urea:formadehyde molar ratio of 1:0.9 to 1.2 until the reaction mixture becomes slightly turbid, and then (b') adding a curing agent to the resulting reaction product solution and reacting them while kneading and dehydrating the mixture to obtain a hydrous cured product of the urea-formaldehyde condensate in which the total methylol content is 0.1 to 1.0% by weight (based on the weight of hydrous product) and the hot water dissolution percentage [percentage of the cured product dissolved in hot water at 80° C. when the product has been immersed therein for 30 minutes (based on the weight of anhydrous product)] is 10% by weight or less.

Process B will be explained in more detail below. In the step (a'), urea and formaldehyde are reacted in a urea:formaldehyde molar ratio of 1:0.9 to 1.2 until the reaction product solution becomes turbid. The formaldehyde used in this reaction is usually a commercially available formalin with a formaldehyde concentration of 35 to 40% by weight, preferably about 37% by weight.

The reaction gives a urea-formaldehyde primary condensate. The reaction conditions used in this step (a') may be properly selected from those which are commonly employed for the production of condensates of this type. The typical reaction conditions in this step (a'), a mixture of urea and 37% formalin in a urea:formaldehyde molar ratio of 1:0.9 to 1.2, is made weakly alkaline, preferably adjusted to a pH of 8, with an alkaline substance such as sodium hydroxide and subjected to reaction at a temperature of 95° C. for about one hour.

The excessive proceeding of the reaction results in deterioration of storage stability of the reaction product solution, so that the reaction is preferably terminated usually at a time when the reaction product solution starts to opacify owing to the urea-formaldehyde primary condensate.

After the reaction, the reaction product solution is adjusted to a pH of 8 to 9 with an alkaline substance for enhancing the storage stability of the product solution.

There is no particular problem when using an aqueous formaldehyde solution with a sufficiently low formaldehyde concentration as one of the starting materials, but in case of using an aqueous formaldehyde solution with a high formaldehyde concentration, for example, 37% aqueous formaldehyde solution, the storage stability of the resulting reaction product solution may be deteriorated, causing a lag of the treatment in the subsequent step (b'). In such a case, the treatment in the step (b') is hindered. Therefore, in case of using an aqueous formaldehyde solution with a high formaldehyde concentration as one of the starting materials, it is desirable to properly dilute the reaction system with water prior to the reaction so that a reaction product solution with a good storage stability can be obtained.

If the amount of urea used in the step (a') is less than the range specified in this invention, the cured product of the urea-formaldehyde primary condensate produced in the subsequent step (b') becomes too hard, and it becomes difficult to obtain the objective product. Also, the resulting product inhibits the germination of seeds and the response thereof as a fertilizer appears rapidly and its response does not continue for a long period of time.

On the other hand, if the amount of urea used in this step is in excess of the defined range, the objective product can be easily produced, but the resulting product inhibits the germination of seeds and its fertilizing effect appears too rapidly as in the case of use of a small amount of urea.

Then a curing agent is added to the reaction product solution obtained in the step (a') and the mixture is subjected to reaction while kneading and dehydrating it in an appropriate apparatus to obtain the final product (slow release fertilizer) comprising a hydrous cured product of the urea-formaldehyde primary condensate (step (b')).

Any curing agent capable of curing the urea-formaldehyde primary condensate can be used in the step (b') treatment, though usually an acidic substance is used. The preferred examples of such substance include, for example, sodium hydrogensulfate, potassium hydrogensulfate, monosodium hydrogenphosphate, monopotassium hydrogenphosphate, phosphoric acid, acetic acid, citric acid, and tartaric acid. These curing agents may be used either alone or in admixture. The curing agent is usually used in such an amount that the reaction product solution is made weakly acidic, especially at a pH of about 3 to 5.

Since the materials to be treated in the step (b') are initially in aqueous solution which is then changed to a slurry, a paste and finally a particle or powder, the apparatus to be used in the treatment in the step (b') must be such that the materials to be treated in these various forms can be continuously stirred, mixed and homogenized, and any apparatus satisfying these conditions may be used regardless of shape and structure. The preferred examples of such apparatus include kneading machines such as various types of kneaders, ribbon mixers, etc.

The reaction product solution obtained in the step (a') and said curing agent are fed to a kneading machine as mentioned above and kneaded therein at a low speed usually at a temperature of 60° to 80° C. while removing water by evaporation from the reaction product solution. In this operation, it needs to properly control the dehydration degree because too high a dehydration degree results in too small a particle size of the final product while too low a dehydration degree causes formation of a large ball-like material. In both cases, the product must be subjected to any after-treatment for obtaining a product in the optimum form as a fertilizer. Accordingly, in the operation of the step (b'), the dehydration degree is desirably controlled so that the water content in the final product is usually 35 to 45% by weight, preferably 40% by weight. Such a treatment can provide a final product having a particle size of usually 0.5 to 5 mm, which is best suited for application as a fertilizer.

The curing reaction of the urea-formaldehyde primary condensate with an acid proceeds more rapidly at a lower pH of the reaction system and at a higher reaction temperature, and as the reaction proceeds, the total methylol content in the product decreases and also the hot water dissolution percentage of the cured product reduces.

In the step (b'), said reaction conditions are properly selected and combined to obtain a final product having the characteristics that the total methylol content is 0.1 to 1.0% by weight (based on the weight of the hydrous product) and the hot water-dissolution percentage [percentage of the cured product dissolved in hot water at 80° C. when the product has been immersed therein for 30 minutes (based on the weight of the anhydrous product)] is 10% by weight or less.

If the total methylol content in the final product and the hot water-dissolution degree are outside the above-defined ranges of this invention, such undesirable problems arise that when the final product is applied as a fertilizer to the soil, it inhibits the germination of seeds or it cannot keep its response for a long period of time.

Next, the effect of this invention will be discussed. Firstly, as apparent from the disclosures in the Examples given later, the slow release fertilizer of this invention, when applied to the soil, releases nitrogen into the soil for a long period of time, usually more than three years, without adversely affecting the germination of seeds, so that it can maintain its fertilizing response for a longer time than the conventional high-grade complex or coated fertilizers, and therefore no additional nitrogen source is required to be supplied. Further, while most of the conventional fertilizers of this type tend to be caked or agglomerated upon absorbing moisture, the slow release fertilizer produced according to this invention is not caked, though it is in the hydrous form, even if it is stored for a long period of time.

Secondly, in most of the conventional processes for producing urea-formaldehyde condensate fertilizers of this type, it is necessary to carry out independent treatments such as perfect dehydration of the final reaction product solution, crushing the cured product, etc. Thus, these processes involve many steps and cannot be said advantageous technically, whereas in the process of this invention, as described above, there is no necessity for the perfect dehydration of the reaction product solution, and also the dehydration of the reaction product solution and the powdering of the dehydrated product can be accomplished in the same step (simultaneously), so that the whole process is simplified as compared with the conventional processes.

DESCRIPTION OF PREFERRED EMBODIMENTS

The present invention will be further described below referring to Examples.

EXAMPLE 1

(1) Production of Slow Release Nitrogen Fertilizer

Step (a)

A mixture of urea and 37% aqueous formaldehyde solution in a urea:formaldehyde molar ratio of 1:2.3 was adjusted to a pH of 7.8 with an aqueous solution of sodium hydroxide and the temperature was elevated from 20° C. to 95° C. at a constant rate with stirring over about 65 minutes. When the temperature of the mixture reached 95° C., the mixture was further subjected to reaction at this temperature for about 30 minutes.

Then the reaction mixture was adjusted to a pH of 4 with an aqueous solution of potassium sulfate and further subjected to reaction at a temperature of 90° to 95° C. for 3 hours.

As a result, an aqueous solution of a urea-formaldehyde primary condensate with a nonvolatile content of about 38% was obtained.

Step (b)

To the aqueous urea-formaldehyde primary condensate solution obtained in the step (a) was added urea in an amount as shown in Table 1 and they were reacted at a temperature of 80° C. for a period as shown in Table 1. The $(\mu' + \mu)/F$ molar ratio in this step was as shown in Table 1.

Step (c)

The reaction product obtained in the step (b) was fed to a kneader, and the temperature of the material therein was adjusted to 70° to 80° C. with stirring, after which 1.5% by volume of 80% phosphoric acid was added thereto.

This mixture was subjected to reaction while maintaining said temperature for a period of time as shown in Table 1, during which the mixture was gradually dehydrated with kneading to obtain a hydrous cured product (final product).

In this treatment, the state of the material in the kneader had changed from the initial liquid state to slurry→paste→ball-like shape→particle→powder, in accordance as the water in the material evaporated.

The properties, water content, etc., of the final product in this step (c) were as shown in Table 1.

(2) Performance Test on Hydrous Cured Product

The hydrous cured products obtained in the step (c) were tested on the following items: total methylol content, hot water-dissolution percentage, bulk density, germination percentage, retention of nitrogen in the soil, and state of growth of turf.

The test results are shown in Table 1. The testing methods for the respective test items were as follows:

(i) Total methylol content

The total amount of methylols in the hydrous cured product (based on the weight of hydrous product) was measured according to the following iodine method: the formaldehyde is oxidized with iodine in the presence of an alkali and made acidic to liberate the unreacted iodine, and the latter is back titrated with sodium thiosulfate. According to this method, both the unreacted formaldehyde and the unreacted methylol groups in the urea-formadehyde reaction system were perfectly reacted, so that their sum can be determined.

Calculation equation:

$$\text{Total methylol amount (\%)} = \frac{(A - B) \times f \times 0.0015 \times 100}{\text{sample weight (g)}}$$

A: consumption (ml) of sodium thiosulfate in the blank test

B: consumption (ml) of sodium thiosulfate in the presence of the sample.

f: factor of 1/10 N sodium thiosulfate.

0.0015: $N/10 Na_2S_2O_3$ 1 ml = 0.0015 g HCHO.

(ii) Hot water-dissolution percentage

The weight percentage to the original sample, of the hydrous cured product dissolved in hot water (based on the weight of anhydrous product), and determined in the following way: about 4 g of sample was placed in 80 ml of water and heated at 80° C. for 30 minutes while stirring from time to time, and then the mixture was filtered and the percentage of the amount of the cured product dissolved in the filtrate to the amount of the original sample (based on the weight of anhydrous product) was determined.

(iii) Germination percenta

Test scale: Neubauer's pot

Test soil: Tone River alluvium (water content: 2.91%; maximum water capacity: 64%), 400 g as dry soil.

Test plant: Brassica Rapa var. pervidis, 20 seeds/10 holes/pot.

Place: glass-house, 25° C.

(iv) Retention of nitrogen in soil

Test scale: 1 m²/plot

Test soil: Tone River alluvium; $NH_4$-N, 0.75 mg/100 g; $NO_3$-N, 0.71 mg/100 g.

The sample was applied in an amount of 0.3 kg in terms of nitrogen per 100 kg/m² of the soil, and the water content of the soil was adjusted to 60±5% of the maximum water capacity of the soil. The test was made in a glass-house adjusted to 25°±5° C. The retention was calculated as follows:

$$\frac{\text{(theoretical amount of sample applied)} - \text{(amount of sample after application)}}{\text{theoretical amount of sample applied}} \times 100$$

(v) State of growth of turf

Test scale: 10 m²/plot.

Test soil: 6:4 mixture of soil and sand.

Turf tested: Korai turf
Amount of sample applied: 0.3 g/100 g of soil.
Test place: open-air.

Seeding was made in March of the first year. The state of growth one year after seeding is the average of the weights (dry weight, g/m² .day) measured during the period from September (6 months after seeding) to November. The state of growth 3 years after seeding is the average of the weights (dry weight, g/m² .day) measured during the period from 30th to 35th month after seeding.

Soil treatment:

First year: creation of green in March; additional application of fertilizer in October.

Second year: additional application of fertilizer in February, April, May, September and October; hilling-up in May and September.

Third year: additional application of fertilizer in February, April, May and September; hilling-up in April and August.

TABLE 1

| Plot | Run No. | Step (b) $(\mu' + \mu)/F$ (molar ratio) | Reaction temperature (°C.) | Reaction time (hr) | Step (c) Final product Reaction time (hr) | Properties | Water content (%) | Overall methylol content (% Wet Base) | Hot water dissolution percentage (% Dry Base) |
|---|---|---|---|---|---|---|---|---|---|
| Control | 1 | | | | 240' | No fluidity, soft gel-like | — | 10.8 | 85 |
| | 2 | | | | 1260' | Solid glass-like, hard to knead | 59 | 8.5 | 31 |
| Control | 3 | 1/1.6 | 80 | 1 | 120' | Solid glass-like, hard to knead | 47 | 1.7 | 17.5 |
| | 4 | | " | 20 | 120' | Solid glass-like, hard to knead | 47.8 | 1.8 | 18.1 |
| Control | 5 | 1/1.4 | " | 1 | 120' | Partially glass-like, somewhat difficult to knead | 45.5 | 1.5 | 13.8 |
| | 6 | | " | 20 | 120' | Partially glass-like, somewhat difficult to knead | 44.8 | 1.7 | 15.1 |
| Control | 7 | 1/1.2 | " | 1 | 43" | No fluidity, soft gel-like | 50.5 | 6.5 | 15.1 |
| | 8 | | " | 1 | 30' | Paste-like | 45.3 | 0.91 | 14.0 |
| | 9 | | " | 1 | 60' | Ball-like | 43.5 | 0.82 | 13.4 |
| This invention | 10 | | " | 1 | 120' | Particle, partially glass-like | 42.3 | 0.53 | 9.1 |
| | 11 | | " | 1 | 150' | Powdery | 38.6 | 0.55 | 8.7 |
| | 12 | | " | 5 | 120' | Particle | 41.5 | 0.68 | 7.6 |
| | 13 | | " | 20 | 120' | Particle | 41.8 | 0.85 | 9.7 |
| Control | 14 | 1/1.0 | " | 1 | 74" | No fluidity, soft gel-like | 50 | 6.1 | 14.8 |
| | 15 | | " | 1 | 15' | Slurry | 47 | 0.95 | 12.3 |
| | 16 | | " | 1 | 30' | Paste-like | 43.5 | 0.82 | 10.8 |
| This invention | 17 | | " | 1 | 60' | Small ball-like | 42.5 | 0.62 | 8.2 |
| | 18 | | " | 1 | 120' | Particle | 41.3 | 0.50 | 7.5 |
| | 19 | | " | 5 | 120' | Particle | 41.8 | 0.79 | 9.3 |
| | 20 | | " | 20 | 120' | Particle | 41.2 | 0.88 | 9.9 |
| Control | 21 | 1/0.9 | " | 1 | 110" | No fluidity, soft gel-like | 48.5 | 5.8 | 13.6 |
| | 22 | | " | 1 | 30' | Paste-like | 45.3 | 0.93 | 11.2 |
| This invention | 23 | | " | 1 | 60' | Small ball-like | 42.0 | 0.79 | 9.8 |
| | 24 | | " | 1 | 120' | Particle | 41.0 | 0.53 | 8.5 |
| | 25 | | " | 1 | 150' | Particle | 38.5 | 0.45 | 8.0 |
| | 26 | | " | 5 | 120' | Particle | 41.5 | 0.51 | 8.3 |
| | 27 | | " | 20 | 120' | Particle | 41.7 | 0.60 | 8.9 |
| Control | 28 | 1/0.8 | " | 5 | 120' | Particle | 36.5 | 0.08 | 13.5 |
| | 29 | | " | 20 | 120' | Particle | 36.8 | 0.15 | 12.5 |
| No treatment | 30 | | | | | | | | |

| Plot | Run No. | Step (c) Final product Apparent density (g/ml) | Fertilizer response Germination (%) Amount of nitrogen supplied into the soil 800 ppm | 1600 ppm | 3200 ppm | Retention of nitrogen in the soil (%) 2 months after application | 1 year after application | 3 years after application | State of growth of turf (g/m² day) 1 year after seeding | 3 years after seeding |
|---|---|---|---|---|---|---|---|---|---|---|
| Control | 1 | — | 0 | 0 | 0 | 85 | 53.8 | 18.2 | 2.7 | 4.5 |
| | 2 | 0.68 | 20 | 0 | 0 | 80 | 58.5 | 20.3 | 2.8 | 4.6 |
| Control | 3 | 0.66 | 35 | 20 | 0 | 85.5 | 59.5 | 18.5 | 2.8 | 4.6 |
| | 4 | 0.65 | 30 | 10 | 0 | 86.3 | 60.1 | 19.2 | 2.9 | 4.8 |
| Control | 5 | 0.65 | 65 | 30 | 0 | 89.5 | 59.7 | 18.8 | 3.0 | 4.9 |
| | 6 | 0.64 | 60 | 20 | 0 | 88.8 | 63.5 | 19.0 | 3.0 | 4.9 |
| Control | 7 | — | 45 | 40 | 30 | 86.2 | 59.8 | 19.3 | 2.9 | 4.8 |
| | 8 | — | 85 | 80 | 70 | 86.4 | 60.8 | 22.3 | 2.9 | 4.9 |
| | 9 | — | 95 | 90 | 95 | 87.5 | 65.8 | 25.5 | 3.2 | 4.9 |
| This invention | 10 | 0.67 | 100 | 95 | 100 | 96.3 | 81.3 | 35.7 | 3.7 | 6.1 |
| | 11 | 0.52 | 100 | 100 | 100 | 96.5 | 82.8 | 38.3 | 3.9 | 6.2 |
| | 12 | 0.65 | 95 | 90 | 90 | 96.5 | 85.3 | 41.2 | 3.5 | 6.0 |
| | 13 | 0.66 | 95 | 90 | 90 | 97.3 | 83.2 | 39.5 | 3.8 | 5.9 |
| Control | 14 | — | 55 | 65 | 50 | 85.8 | 61.3 | 23.5 | 3.2 | 5.1 |
| | 15 | — | 75 | 60 | 55 | 86.8 | 62.3 | 26.8 | 3.3 | 5.0 |
| | 16 | — | 95 | 90 | 80 | 87.9 | 62.5 | 27.3 | 3.3 | 4.8 |
| This invention | 17 | — | 95 | 100 | 100 | 88.3 | 70.5 | 28.4 | 3.5 | 5.8 |
| | 18 | 0.68 | 100 | 100 | 100 | 95.6 | 80.5 | 37.5 | 3.8 | 6.0 |

TABLE 1-continued

| | | | | | | | | | | |
|---|---|---|---|---|---|---|---|---|---|---|
| tion | 19 | 0.67 | 80 | 95 | 80 | 81.1 | 70.3 | 33.8 | 3.8 | 5.3 |
| | 20 | 0.68 | 70 | 70 | 60 | 75.5 | 73.2 | 32.3 | 3.7 | 5.4 |
| Con- | 21 | — | 60 | 60 | 55 | 79.8 | 58.8 | 24.8 | 3.5 | 4.9 |
| trol | 22 | — | 75 | 70 | 60 | 83.2 | 65.9 | 20.9 | 3.4 | 5.0 |
| This | 23 | 0.70 | 90 | 95 | 85 | 91.8 | 78.5 | 38.2 | 3.8 | 5.9 |
| inven- | 24 | 0.69 | 95 | 95 | 90 | 92.5 | 82.8 | 38.8 | 3.9 | 5.8 |
| tion | 25 | 0.55 | 90 | 95 | 90 | 93.8 | 81.2 | 30.3 | 3.9 | 5.7 |
| | 26 | 0.67 | 90 | 85 | 80 | 80.0 | 70.2 | 22.5 | 4.0 | 5.1 |
| | 27 | 0.68 | 80 | 85 | 75 | 73.5 | 58.5 | 29.3 | 3.8 | 5.0 |
| Con- | 28 | 0.68 | 85 | 95 | 90 | 64.6 | 53.2 | 17.5 | 4.0 | 4.7 |
| trol | 29 | 0.66 | 85 | 95 | 90 | 70.0 | 56.8 | 16.3 | 4.1 | 4.8 |
| No treatment | 30 | | | | | | | | 2.5 | 4.1 |

EXAMPLE 2

(1) Production of Slow Release Nitrogen Fertilizer

Step (a)

Urea and 37% aqueous formaldehyde solution were mixed in the urea to formaldehyde molar ratios shown in Table 2. Each mixture was adjusted to a pH of 8.0 with sodium hydroxide, and water was properly added thereto, after which the resulting mixture was heated from room temperature to 95° C. at a constant rate over about one hour.

The mixture was left at 95° C. for 30 minutes, then adjusted to a pH of 8.0 and quickly cooled close to room temperature to obtain a white turbid solution of urea-formaldehyde procondensate.

The amounts of water added to the reaction system in this treatment are shown in Table 2.

Step (b)

The reaction product obtained in the step (a) was fed to a kneader, adjusted to a temperature of 70°–80° C. under stirring and then 3.0% by volume of 40% phosphoric acid was added.

The mixture, maintained at said temperature, was reacted for the periods shown in Table 2 while gradually dehydrating the mixture under kneading to obtain a hydrous cured product (final product).

In this treatment, the material in the kneader has undergone a sequential change of state from the initial liquid state to slurry→paste→ball-like→particle→powder in accordance with evaporation of water in the material.

The water content and other particulars of the final products in the step (b) were as shown in Table 2.

(2) Performance Test of Hydrous Cured Product

The hydrous cured products obtained in the step (b) were subjected to the tests on the following items: total methylol content, hot water-dissolution percentage, bulk density, germination degree, nitrogen retention in the soil, and state of growth of turf.

The test results are shown in Table 2. The testing methods used for the respective test items are the same as in Example 1.

TABLE 2

| | | Step (a) | | | Step (b) | | | | |
|---|---|---|---|---|---|---|---|---|---|
| | | | Amount of water added (% to urea) | Reaction time (min) | Final Product | | | | |
| Plot | Run No. | Urea/form-aldehyde molar ratio | | | Properties | Water content (%) | Total methylol content (% Wet Base) | Hot water dissolution percentage (% Dry Base) | Apparent density (g/ml) |
| Control | 1 | 1/1.5 | 50 | 180 | Solid glass-like | 46.3 | 2.8 | 15.8 | 0.68 |
| This invention | 2 | 1/1.2 | 50 | 180 | Locally solid glass-like | 41.9 | 1.0 | 9.5 | 0.67 |
| This inven- tion | 3 | 1/1.1 | 50 | 180 | Particle | 41.8 | 0.60 | 8.3 | 0.67 |
| | 4 | | 10 | 150 | Particle | 42.1 | 0.45 | 7.5 | 0.68 |
| | 5 | | 20 | 160 | Particle | 41.9 | 0.48 | 7.6 | 0.68 |
| Control | 6 | 1/1.0 | 50 | 15 | Slurry | 45.6 | 1.5 | 12.3 | 1.14 |
| | 7 | | 50 | 30 | Slurry | 43.8 | 1.3 | 11.5 | 1.15 |
| | 8 | | 50 | 60 | Paste | 42.5 | 1.2 | 9.5 | 1.09 |
| This inven- tion | 9 | | 50 | 90 | Ball-like | 41.2 | 0.48 | 8.0 | 0.70 |
| | 10 | | 50 | 120 | Ball-like | 40.1 | 0.46 | 7.8 | 0.69 |
| | 11 | | 50 | 150 | Particle | 39.2 | 0.44 | 7.2 | 0.68 |
| | 12 | | 50 | 180 | Powder | 36.1 | 0.45 | 7.5 | 0.69 |
| | 13 | | 70 | 200 | Particle | 41.0 | 0.42 | 6.8 | 0.67 |
| This invention | 14 | 1/0.9 | 50 | 180 | Particle | 35.2 | 0.45 | 7.9 | 0.68 |
| Control | 15 | 1/0.8 | 50 | 180 | Particle | 33.8 | 0.18 | 13.5 | 0.62 |
| No treatment | 16 | | | | | | | | |

| | Fertilizer response | | | | |
|---|---|---|---|---|---|
| | Germination degree (%) Amount of nitrogen supplied into the soil | Nitrogen retention in the soil (%) | | | State of growth of turf (g/m² day) |
| | | 2 months after | 1 year after | 3 years after | 1 year  3 years |

TABLE 2-continued

| Plot | Run No. | 800 ppm | 1600 ppm | 3200 ppm | application | application | application | after seeding | after seeding |
|---|---|---|---|---|---|---|---|---|---|
| Control | 1 | 40 | 25 | 0 | 86.0 | 60.2 | 19.5 | 2.9 | 4.7 |
| This invention | 2 | 90 | 80 | 90 | 96.8 | 82.5 | 36.8 | 3.7 | 6.0 |
| This invention | 3 | 95 | 100 | 95 | 97.0 | 83.8 | 38.9 | 3.8 | 6.1 |
|  | 4 | 100 | 100 | 95 | 96.8 | 84.3 | 38.2 | 3.9 | 6.1 |
|  | 5 | 95 | 100 | 90 | 97.2 | 82.6 | 37.9 | 3.8 | 6.2 |
| Control | 6 | 70 | 65 | 55 | 80.5 | 60.5 | 23.8 | 3.2 | 4.8 |
|  | 7 | 75 | 70 | 60 | 85.3 | 63.8 | 30.2 | 3.3 | 4.9 |
|  | 8 | 80 | 75 | 65 | 87.3 | 70.5 | 33.8 | 3.2 | 5.2 |
| This invention | 9 | 95 | 90 | 95 | 98.3 | 83.2 | 36.8 | 3.9 | 6.0 |
|  | 10 | 100 | 95 | 100 | 95.8 | 82.1 | 33.8 | 4.1 | 6.1 |
|  | 11 | 100 | 95 | 100 | 96 | 82.0 | 32.1 | 3.9 | 6.2 |
|  | 12 | 95 | 100 | 90 | 94.3 | 83.5 | 35.0 | 3.7 | 6.3 |
|  | 13 | 95 | 90 | 90 | 93.2 | 82.5 | 31.2 | 3.9 | 6.0 |
| This invention | 14 | 90 | 95 | 95 | 92.3 | 80.5 | 30.5 | 4.1 | 5.8 |
| Control | 15 | 85 | 75 | 80 | 65.3 | 57.9 | 18.3 | 4.1 | 4.9 |
| No treatment | 16 |  |  |  |  |  |  | 2.5 | 4.1 |

What is claimed is:

1. A slow release nitrogen fertilizer comprising a hydrous cured product of a urea-formaldehyde condensate in which the total methylol content is 0.1 to 1.0% by weight (based on the weight of hydrous product) and the hot water-dissolution percentage (percentage of the cured product dissolved in hot water at 80? C. when the product has been immersed therein for 30 minutes, based on the weight of anhydrous product) is 10% by weight or less (based on the dry weight of the hydrous condensate rather than in terms of nitrogen content).

2. The slow release nitrogen fertilizer of claim 1, wherein said hydrous cured product is cured with an acidic curing agent selected from the group consisting of sodium hydrogensulphate, sulfate, potassium hydrogensulfate, monosodium hydrogenphosphate, monopotassium hydrogen-phosphate, acetic acid, citric acid, tartaric acid, phosphoric acid and mixtures thereof.

3. A process for producing a slow release nitrogen fertilizer, said nitrogen fertilizer comprising a hydrous cured product of a urea-formaldehyde condensate in which the total methylol content is 0.1 to 1.0% by weight based on the weight of hydrous product, said product having a hot water dissolution percentage of 10% by weight or less said process comprising:

(a) reacting urea and formalin in a urea: formaldehyde molar ratio of 1:2.0 to 2.5 in the presence of an alkaline material in the absence of ammonia to produce an aqueous solution of a urea-formaldehyde precondensate having such a condensation degree that the condensate is substantially soluble in water;

(b) adding to said aqueous solution urea in such an amount that the following relation is satisfied:

$(\mu' + \mu):F = 1:0.9$ to $1.2$ wherein $\mu'$: molar amount of urea used in this step (b),
$\mu$: molar amount of urea used in the step (a),
F : molar amount of formaldehyde used in the step (a), and reacting said urea with said precondensate until the reaction mixture becomes slightly turbid in the reaction system; and (c) adding a curing agent to the thus obtained reaction product solution and reacting them while kneading and dehydrating the mixture to produce a cured product in which the total methylol content is 0.1 to 1.0% by weight (based on the weight of hydrous product) and the hot water-dissolution percentage is 10% by weight or less, said hot water dissolution percentage based on the cured product dissolved in hot water at 80? C. when the product has been immersed therein for thirty minutes and further based on the weight of anhydrous product.

4. A process according to claim 3 including the step of adjusting the pH of the mixture obtained in step (a) to 4 before proceeding with step (b).

5. Process according to claim 3, wherein said curing agent is selected from the group consisting of sodium hydrogensulfate, potassium hydrogen sulfate, monosodium hydrogen phosphate, monopotassium hydrogenphosphate, phosphoric acid, acetic acid, citric acid, tartaric acid and mixtures thereof.

6. Process according to claim 5 wherein the amount of said curing agent is such that the reaction product solution has a pH of about 3 to 5.

7. A process according to claim 3 wherein the alkaline material in step (a) is sodium hydroxide.

8. A process according to claim 7 wherein the pH in step (a) is weakly alkaline and is between 7 and 8.

9. The product prepared by the process of claim 7.

10. The product prepared by the process of claim 3.

11. A process for producing a slow release nitrogen fertilizer said nitrogen fertilizer comprising a hydrous cured product of a urea-formaldehyde condensate in which the total methylol content is 0.1 to 1.0% by weight based on the weight of hydrous product, said product having a hot water dissolution percentage of 10% by weight or less, said process comprising:

(a') reacting urea and formalin in a urea:formaldehyde molar ratio of 1:0.9 to 1.2 until the reaction mixture becomes turbid, said reaction being conducted in the absence of ammonia and (b') adding a curing agent to the resulting reaction product solution and reacting them while kneading and dehydrating the mixture to produce a hydrous cured product in which the total methylol content is 0.1 to 1.0% by weight (based on the weight of hydrous product) and the hot water-dissolution percentage is 10% by weight or less, said hot water dissolution percentage being based on the cured product dissolved in hot water at 80° C. when the product has been immersed therein for thirty minutes and further based on the weight of anhydrous product.

12. The product prepared by the process of claim 11.

13. Process according to claim 11 wherein said curing agent is selected from the group consisting of sodium hydrogensulfate, potassium hydrogen sulfate, monosodium hydrogenphosphate, monopotassium hydrogenphosphate, phosphoric acid, acetic acid, citric acid, tartaric acid and mixtures thereof.

14. Process according to claim 13, wherein the amount of said curing agent used is such that the reaction product solution has a pH of about 3 to 5.

15. A process according to claim 11 wherein step (a′) is carried out under weakly alkaline conditions using sodium hydroxide as the source of alkaline material.

16. The product prepared by the process of claim 15.

17. A process according to claim 15 wherein the pH is 8.

* * * * *

UNITED STATES PATENT AND TRADEMARK OFFICE
CERTIFICATE OF CORRECTION

PATENT NO. : 4,596,593

DATED : June 24, 1986

INVENTOR(S) : TAZAWA et al

It is certified that error appears in the above-identified patent and that said Letters Patent is hereby corrected as shown below:

(In claim 1,)
Column 13, line 28: "80?C." should be --80°C.--.

Column 13, line 36 (in claim 2): the phrase ", sulphate" should be deleted.

Column 15, line 1 (in claim 11): "80?C." should be --80°C.--.

Signed and Sealed this

Seventeenth Day of March, 1987

Attest:

DONALD J. QUIGG

Attesting Officer

Commissioner of Patents and Trademarks